US010395084B2

(12) United States Patent
Lee et al.

(10) Patent No.: US 10,395,084 B2
(45) Date of Patent: Aug. 27, 2019

(54) FINGERPRINT IDENTIFICATION DEVICE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW); Chia-Cheng Lei, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 207 days.

(21) Appl. No.: 15/720,572

(22) Filed: Sep. 29, 2017

(65) Prior Publication Data

US 2019/0102591 A1 Apr. 4, 2019

(51) Int. Cl.
*G06K 9/00* (2006.01)
*G06F 3/044* (2006.01)

(52) U.S. Cl.
CPC ........... *G06K 9/0002* (2013.01); *G06F 3/044* (2013.01); *G06K 9/00053* (2013.01); *G06F 2203/04107* (2013.01)

(58) Field of Classification Search
CPC .......... G06F 3/044; G06F 2203/04107; G06K 9/0002; G06K 9/00053
See application file for complete search history.

(56) References Cited

U.S. PATENT DOCUMENTS 5,963,679 A * 10/1999 Setlak .................. G06K 9/0002 382/312
9,322,794 B2 * 4/2016 Setlak .................... G01N 27/02
2015/0035787 A1 * 2/2015 Shahparnia ............. G06F 3/044 345/174
2016/0055363 A1 * 2/2016 Lee ...................... G06K 9/0002 382/124
2016/0188949 A1 * 6/2016 Yang .................... G06K 9/0002 382/124
2016/0350577 A1 12/2016 Yang et al.
2018/0025203 A1 * 1/2018 Lee ....................... G06F 3/0418 382/124
2018/0300521 A1 * 10/2018 Kim ..................... G06K 9/0002
2018/0349666 A1 * 12/2018 Chen .................... G06K 9/0008

* cited by examiner

*Primary Examiner* — Utpal D Shah
(74) *Attorney, Agent, or Firm* — Muncy, Geissler, Olds & Lowe, P.C.

(57) ABSTRACT

A fingerprint identification device includes a plurality of fingerprint sensing electrodes, a shielding enhancement electrode, a fingerprint detection circuit and an auxiliary enhancement signal circuit. The shield enhancement electrode corresponds to a plurality of the fingerprint sensing electrodes. The fingerprint detection circuit is powered by a first power supply and includes a capacitive stimulation signal source. The auxiliary enhancement signal circuit is powered by a second power supply and includes an auxiliary enhancement signal source. The fingerprint detection circuit transmits a capacitive stimulation signal to a selected fingerprint sensing electrode, and receives a fingerprint sensing signal. The fingerprint sensing signal is amplified to generate a capacitive elimination shielding signal. The capacitive elimination shielding signal is transmitted to the shielding enhancement electrode. The auxiliary enhancement signal circuit outputs an auxiliary enhancement signal to the shielding enhancement electrode for performing a fingerprint detection operation.

18 Claims, 8 Drawing Sheets

FINGERPRINT IDENTIFICATION DEVICE

BACKGROUND OF THE INVENTION

1. Field of the Invention

The present invention relates to the technical field of biological sensing and, more particularly, to a fingerprint identification device.

2. Description of Related Art

Due to the fast rising of e-commerce, the development of remote payment is dramatically increasing, and thus the business demand for the biometrics is also rapidly expanded. The biometrics technology can be divided into the fingerprint identification, the iris identification, the DNA identification, and so on. In order to satisfy the requirements of efficiency, safety and non-invasiveness, the fingerprint identification has become the preferred choice for the biometrics technology. The fingerprint identification technology can be divided into the optical identification, the thermal induction identification, the ultrasonic identification, and the capacitive identification. In consideration of the device size, cost, power consumption, reliability and security, the capacitive identification is the outstanding choice.

For the typical capacitive fingerprint identification, there are a sweep-type fingerprint identification and a press-type fingerprint identification, wherein the press-type fingerprint identification has a better performance in the identification capability, efficiency and convenience. However, due to that the sensing signal is extremely small and the surrounding noise is huge and complicated, the sensing electrodes and the sensing circuit are generally packaged in one integrated circuit (IC) chip for the press-type fingerprint identification.

In a typical display device, there is an opening in the protective glass of the display device, in which the fingerprint identification IC protected by sapphire film with a high dielectric constant is deployed as a button that is made in a complicated manner to hold the fingerprint identification IC in the opening of the protective glass. A metal frame of the button is used to transmit a high frequency signal to a user's finger, and then the sensing circuit reads the fingerprint sensing signal from the sensing electrodes to perform the fingerprint identification operation. With such a structure, it not only greatly increases the material cost and packaging process cost, but also reduces the yield, waterproof, lifetime and tolerance of the product. In addition, when operating the display device with such a fingerprint identification, the user may be in danger of electric shock. Therefore, the industry has been committed to increase the fingerprint sensitivity and signal noise ratio (SNR) for increasing sensing distance as much as possible, and simplify the package structure of the fingerprint identification IC to be deployed under the protective glass for increasing the yield, waterproof, lifetime and tolerance of the product. Accordingly, it is desirable to provide a fingerprint identification device to mitigate and/or obviate the aforementioned problems.

SUMMARY OF THE INVENTION

The object of the present disclosure is to provide a fingerprint identification device capable of dramatically increasing accuracy of the acquired fingerprint image. A fingerprint detection circuit of the present disclosure does not need to be fabricated with the high voltage integrated circuit process, and thus the circuit area can be greatly reduced. In addition, the present disclosure is provided with an auxiliary enhancement signal circuit which is simply a signal source. Although the signal source is fabricated by a high voltage integrated circuit process, its circuit area is much smaller than the circuit area of the fingerprint detection circuit, and thus the manufacturing cost can be greatly reduced.

In accordance with one aspect of the present disclosure, there is provided fingerprint identification device, which comprises a plurality of fingerprint sensing electrodes, at least one shielding enhancement electrode, a fingerprint detection circuit, and an auxiliary enhancement signal circuit. The at least one shielding enhancement electrode is corresponding to a plurality of the fingerprint sensing electrodes. The fingerprint detection circuit is powered by a first power source, and includes a capacitive stimulation signal source. The auxiliary enhancement signal circuit is powered by a second power source, and includes an auxiliary enhancement signal source. The fingerprint detection circuit transmits a capacitive stimulation signal of the capacitive stimulation signal source to a selected fingerprint sensing electrode, receives a fingerprint sensing signal from the selected fingerprint electrode, applies the fingerprint sensing signal and the capacitive stimulation signal signals individually or together to an amplifier with a gain greater than or equal to zero to generate a capacitive elimination shielding signal with a phase same as the capacitive stimulation signal or the fingerprint sensing signal, and transmits the capacitive elimination shielding signal to the shielding enhancement electrode corresponding to the selected fingerprint sensing electrode for performing a fingerprint detection operation. The auxiliary enhancement signal source of the auxiliary enhancement signal circuit outputs an auxiliary enhancement signal to the shielding enhancement electrode corresponding to the selected fingerprint sensing electrode for performing the fingerprint detection operation.

In accordance with another aspect of the present disclosure, there is provided a fingerprint identification device, which comprises a plurality of fingerprint sensing electrodes, at least one shielding enhancement electrode, and a fingerprint detection integrated circuit. The at least one shielding enhancement electrode is corresponding to a plurality of the fingerprint sensing electrodes. The fingerprint detection integrated circuit includes a first power source, a fingerprint detection circuit, a second power source, an auxiliary enhancement signal circuit, and a power source charging switching circuit. The fingerprint detection circuit is powered by the first power source, and has a capacitive stimulation signal source. The auxiliary enhancement signal circuit is powered by the second power source. The power source charging switching circuit is arranged between the first power source and the second power source, and has at least two transistor switches and at least one capacitor. The fingerprint detection circuit transmits a capacitive stimulation signal of the capacitive stimulation signal source to a selected fingerprint sensing electrode, receives a fingerprint sensing signal from the selected fingerprint electrode, applies the fingerprint sensing signal and the capacitive stimulation signal signals individually or together to an amplifier with a gain greater than or equal to zero to generate a capacitive elimination shielding signal with a phase same as the capacitive stimulation signal or the fingerprint sensing signal, and transmits the capacitive elimination shielding signal to the shielding enhancement electrode corresponding to the selected fingerprint sensing electrode for performing a fingerprint detection operation. The auxiliary enhancement signal circuit outputs an auxiliary enhancement signal to the shielding enhancement electrode corresponding to the selected fingerprint sensing electrode for performing the fingerprint detection operation, and there is no current loop existed between the first power source and the second power source during the fingerprint detection operation.

DETAILED DESCRIPTION OF THE PREFERRED EMBODIMENT

Figure 1:
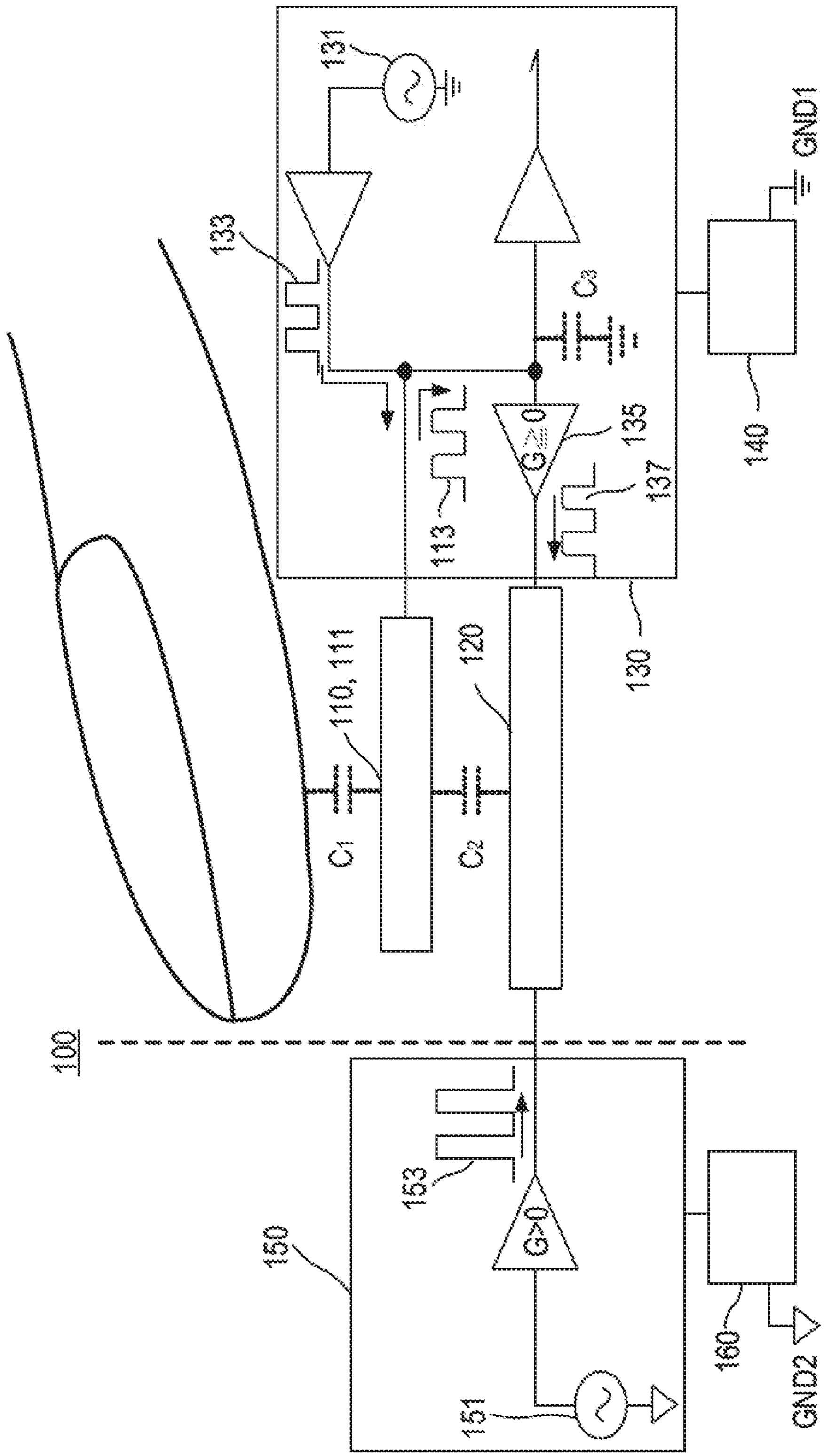
FIG. 1 is a schematic diagram of the fingerprint identification device in accordance with a first embodiment of the present disclosure.

The present invention relates to a fingerprint identification device. FIG. 1 is a schematic diagram of the fingerprint identification device 100 in accordance with a first embodiment of the present disclosure. As shown, the fingerprint identification device 100 includes a plurality of fingerprint sensing electrodes 110, at least one shielding enhancement electrode 120, a fingerprint detection circuit 130, a first power source 140, an auxiliary enhancement signal circuit 150, and a second power source 160.

In FIG. 1, for clearness of drawing, it only shows one fingerprint sensor electrode 110. In the practical case, there is a plurality of fingerprint sensing electrodes 110 arranged in a matrix form. It can be implemented by those skilled in the prior art in accordance with the descriptions of the present disclosure and thus a detailed description is deemed unnecessary. The at least one shielding enhancement electrode 120 is corresponding to a plurality of the fingerprint sensing electrodes 110.

The fingerprint detection circuit 130 is powered by the first power source 140, and includes a capacitive stimulation signal source 131 and an amplifier 135. The capacitive stimulation signal source 131 generates a capacitive stimulation signal 133, and the gain of the amplifier 135 is greater than or equal to zero.

The auxiliary enhancement signal circuit 150 is powered by a second power source 160, and includes an auxiliary enhancement signal source 151 to generate an auxiliary enhancement signal 153.

The fingerprint detection circuit 130 transmits the capacitive stimulation signal 133 of the capacitive stimulation signal source 131 to a selected fingerprint sensing electrode 111. The capacitive stimulation signal 133 is a sine wave signal, a square wave signal, a triangle wave signal, or a trapezoidal wave signal. The fingerprint detection circuit 130 receives a fingerprint sensing signal 113 from the selected fingerprint electrode 111, applies the fingerprint sensing signal 113 and the capacitive stimulation signal 133 signals individually or together to the amplifier 135 to generate a capacitive elimination shielding signal 137 with a phase as same as the capacitive stimulation signal 133 or the fingerprint sensing signal 113, and then transmits the capacitive elimination shielding signal 137 to the at least one shielding enhancement electrode 120 corresponding to the selected fingerprint sensing electrode 111 for performing a fingerprint detection operation.

At the same time, the auxiliary enhancement signal source 151 of the auxiliary enhancement signal circuit 150 outputs the auxiliary enhancement signal 153 to the at least one shielding enhancement electrode 120 corresponding to the selected fingerprint sensing electrode 111 for performing the fingerprint detection operation. The auxiliary enhancement signal 153 is a sine wave signal, a square wave signal, a triangle wave signal, or a trapezoidal wave signal. It is noted that, during the fingerprint detection operation, there is no current loop existed between the first power source 140 and the second power source 160.

The auxiliary enhancement signal 153 has a phase as same as the capacitive stimulation signal 133 during the fingerprint detection operation. The amplitude of the auxiliary enhancement signal 153 is greater than that of the capacitive stimulation signal 133 during the fingerprint detection operation.

As shown in FIG. 1, the plurality of fingerprint sensing electrodes 110, the at least one shielding enhancement electrode 120 and the fingerprint detection circuit 130 are arranged in the same integrated circuit. The fingerprint detection circuit 130 and the auxiliary enhancement signal circuit 150 are arranged in different integrated circuits, respectively.

Since the fingerprint detection circuit 130 and the auxiliary enhancement signal circuit 150 are respectively arranged in different integrated circuits and the amplitude of the auxiliary enhancement signal 153 is much larger than the amplitude of the capacitive stimulation signal 133, only the auxiliary enhancement signal circuit 150 needs to be fabricated by using a high voltage integrated circuit process, while the fingerprint detection circuit 130 can be fabricated with a typical voltage integrated circuit process. Due to the fingerprint detection circuit 130 being fabricated not by using the high voltage integrated circuit process, the circuit area can be greatly reduced. At the same time, since the auxiliary enhancement signal circuit 150 is only a signal source that is fabricated by using a high voltage integrated circuit process, its circuit area is much smaller than the circuit area of the fingerprint detection circuit 130, and thus the manufacturing cost can be greatly reduced.

In another embodiment, the plurality of fingerprint sensing electrodes 110 and the at least one shielding enhancement electrode 120 are arranged on a glass substrate or a polymer film substrate outside an integrated circuit chip which includes the fingerprint detection circuit 130.

Figure 2:
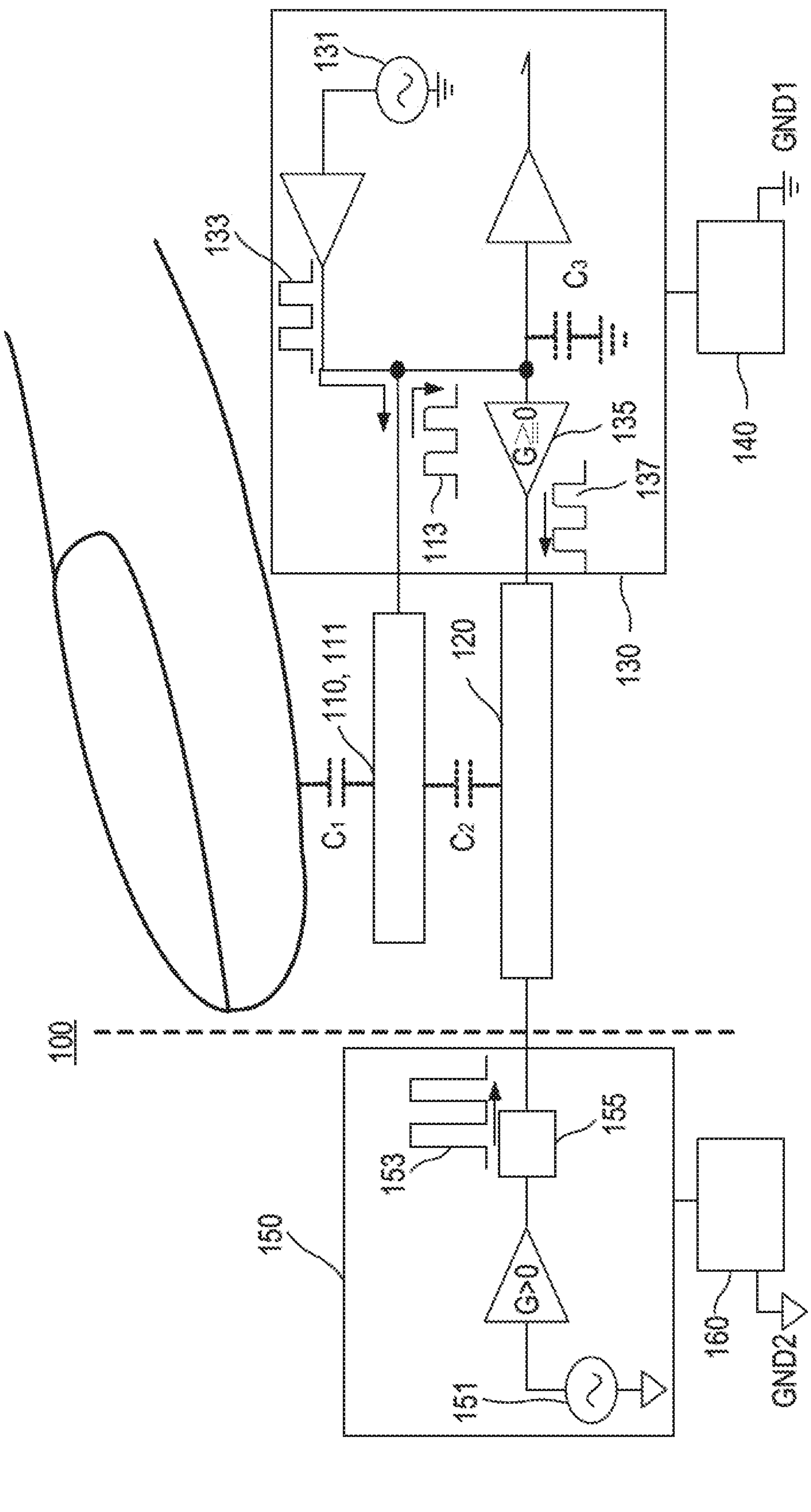
FIG. 2 is a schematic diagram of the fingerprint identification device in accordance with a second embodiment of the present disclosure.

FIG. 2 is a schematic diagram of the fingerprint identification device 100 in accordance with a second embodiment of the present disclosure, which is similar to the first embodiment shown in FIG. 1 except that: in FIG. 2, the auxiliary enhancement signal 153 is coupled to the at least one shielding enhancement electrode 120 through an impedance 155, wherein the impedance 155 can be an inductor or a capacitor.

Figure 3:
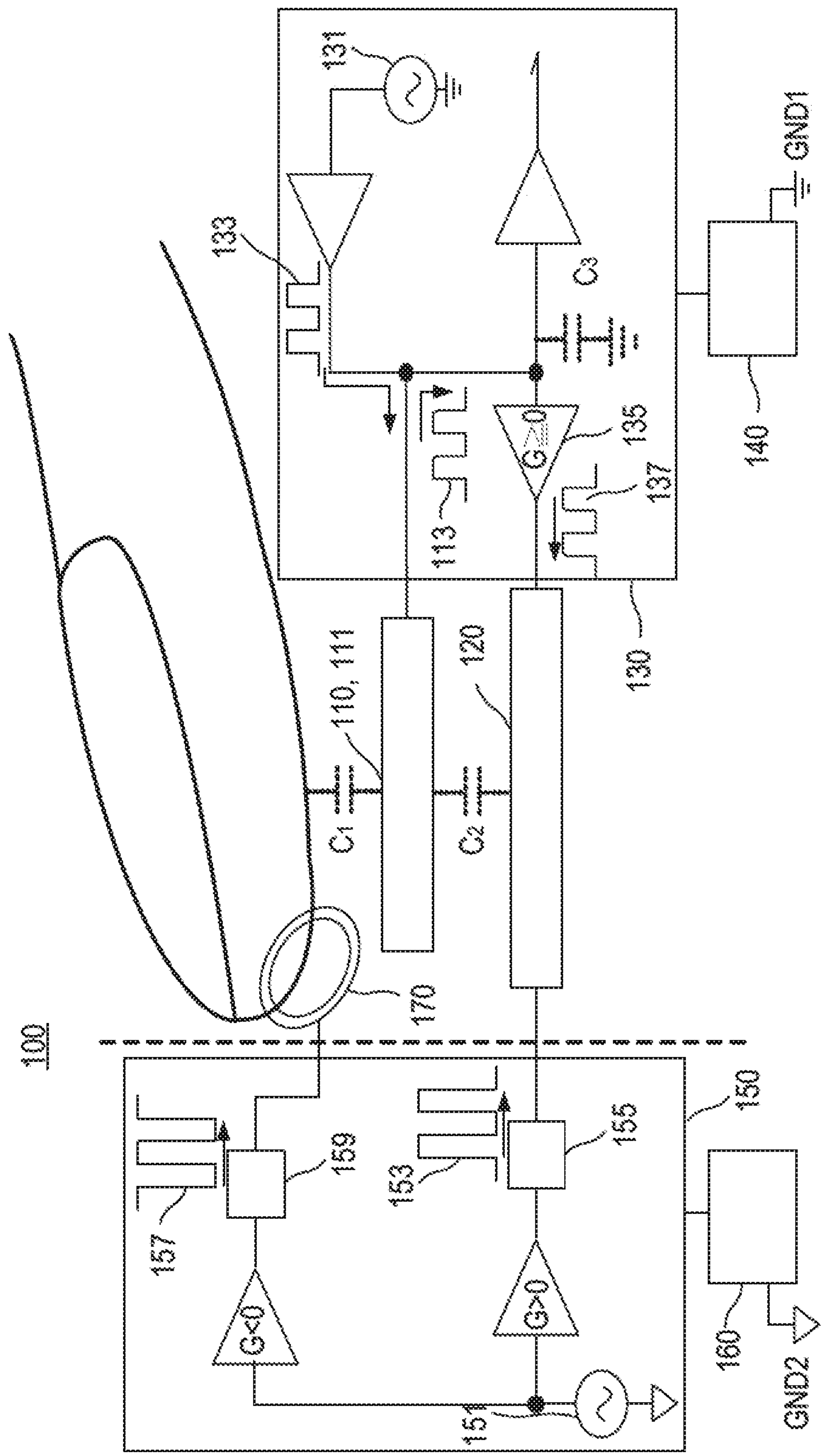
FIG. 3 is a schematic diagram of the fingerprint identification device in accordance with a third embodiment of the present disclosure.

FIG. 3 is a schematic diagram of the fingerprint identification device 100 in accordance with a third embodiment of the present disclosure. The difference between FIG. 2 and FIG. 3 is that: in FIG. 3, the auxiliary enhancement signal circuit 150 further transmits an inverting auxiliary signal 157 with a phase reverse to the auxiliary enhancement signal 153 to a user's finger through an impedance 159, wherein the impedance 159 can be an inductor, a resistor or a capacitor.

As shown in FIG. 3, the fingerprint identification device 100 further includes a contact conductor, which is, for example, a metal ring 170. The size of the fingerprint sensing electrodes 110 is about 50 μm×50 μm, and the size of the metal ring 170 is about 1 cm×1 cm. In FIG. 3, the drawings of the metal ring 170 and fingerprint sensing electrodes 110 are the schematic view, but not to scale. The plurality of fingerprint sensing electrodes 110 may be disposed within the metal ring 170, which may be electrically connected to the impedance 159. When a fingerprint detection operation is performed, a user may touch the metal ring 170 by his/her finger and the inverting auxiliary signal 157 is coupled to the user's finger via the impedance 159 and the metal ring 170, and then the plurality of the fingerprint sensing electrodes 110 may sense the fingerprint ridge and fingerprint valley of the user's finger to acquire the fingerprint sensing images. Since the phase of the inverting auxiliary signal 157 is opposite to the phase of the auxiliary enhancement signal 153, the voltage variation on the capacitor C1 is doubled, and thus the fingerprint sensing image can be obtained with more accuracy.

The capacitor C1 is representative of the capacitance between the finger and the fingerprint sensing electrode 111, the capacitor C2 is representative of the capacitance between the at least one shielding enhancement electrode 120 and the fingerprint sensing electrode 111, and the capacitor C3 is representative of the capacitance between the input terminal of the amplifier circuit 135 and the first ground GND1. The capacitor C1, capacitor C2 and capacitor C3 are not the physically existed capacitors, and thus they are depicted by the dotted line. In another embodiment, the metal ring 170 can be replaced with a conductive pad to achieve the purpose of transmitting the inverting auxiliary signal 157 to a user's finger for obtaining more accurate fingerprint sensing images.

In the embodiments of FIG. 1 to FIG. 3, the fingerprint detection circuit 130 and the auxiliary enhancement signal circuit 150 are arranged in different integrated circuits, respectively. In other embodiment, the fingerprint detection circuit 130 and the auxiliary enhancement signal circuit 150 may be arranged in the same integrated circuit. In such a case, the first power source 140 and the second power source 160 need to be rearranged so that the first power source 140 and the second power supply 160 are different and independent from each other.

Figure 4:
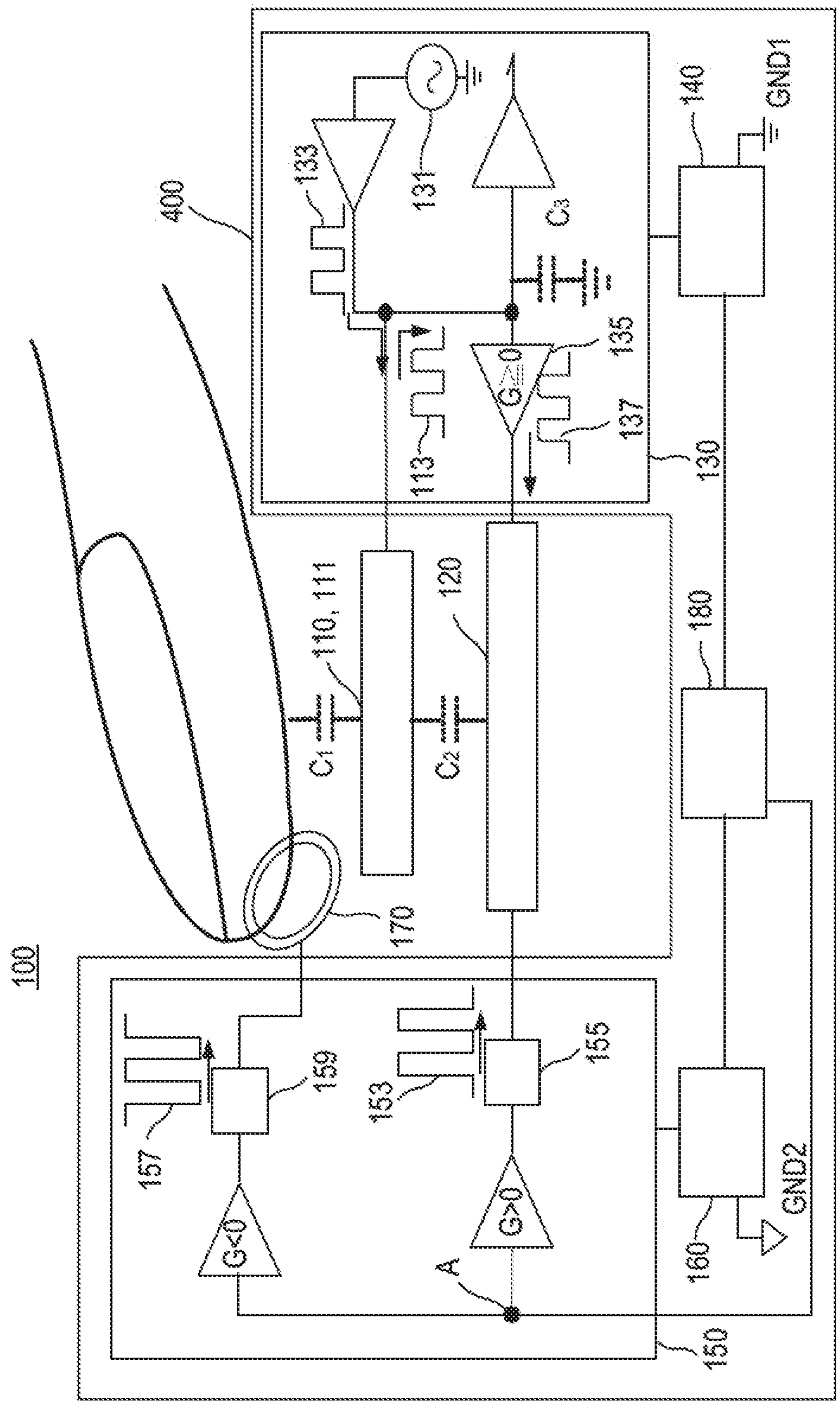
FIG. 4 is a schematic diagram of the fingerprint identification device in accordance with a fourth embodiment of the present disclosure.

FIG. 4 is a schematic diagram of the fingerprint identification device 100 in accordance with a fourth embodiment of the present disclosure. As shown, the fingerprint identification device 100 includes a plurality of fingerprint sensing electrodes 110, at least one shielding enhancement electrode 120, and a fingerprint detection integrated circuit 400. The fingerprint detection integrated circuit 400 includes a fingerprint detection circuit 130, a first power source 140, an auxiliary enhancement signal circuit 150, and a second power source 160, a metal ring 170, and a power source charging switching circuit 180.

In FIG. 4, for clearness of drawing, it only shows one fingerprint sensor electrode 110. In the practical case, there is a plurality of fingerprint sensing electrodes 110 arranged in a matrix form. It can be implemented by those skilled in the prior art in accordance with the descriptions of the present disclosure and thus a detailed description is deemed unnecessary. The at least one shielding enhancement electrode 120 is corresponding to a plurality of the fingerprint sensing electrodes 110.

The fingerprint detection circuit 130 is powered by the first power source 140, and includes a capacitive stimulation signal source 131 and an amplifier 135. The capacitive stimulation signal source 131 generates a capacitive stimulation signal 133, and the gain of the amplifier 135 is greater than or equal to zero.

The auxiliary enhancement signal circuit 150 is powered by a second power source 160.

The power source charging switching circuit 180 is arranged between the first power source 140 and the second power source 160.

Figure 5:
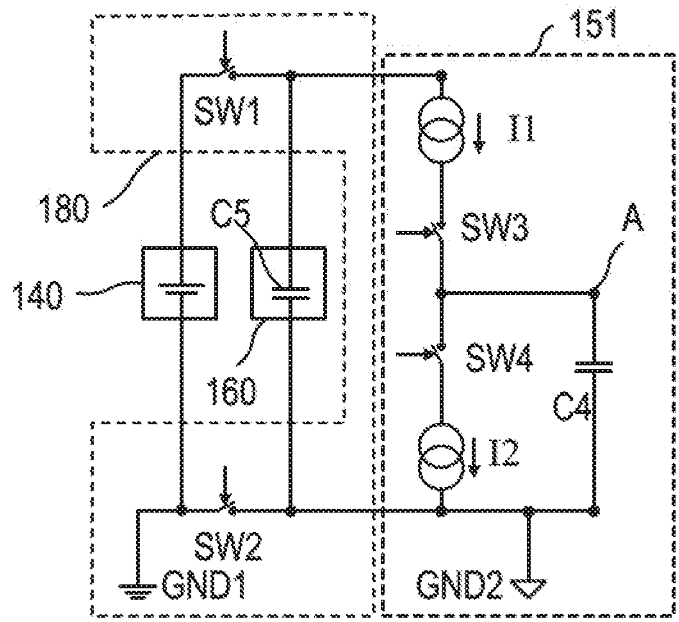
FIG. 5 is a schematic diagram of the power source charging switching circuit, the first power source, the second power source and the auxiliary enhancement signal source in accordance with the present disclosure.

FIG. 5 is a schematic diagram of the power source charging switching circuit 180, the first power source 140, the second power source 160 and the auxiliary enhancement signal source 151 in accordance with the present disclosure. As shown, the second power source 160 includes at least one capacitor C5. The power source charging switching circuit 180 includes at least two transistor switches SW1 and SW2. The auxiliary enhancement signal source 151 includes two current source circuits I1 and I2, two transistor switches SW3 and SW4, and a capacitor C4.

One end of the transistor switch SW1 is connected to one end of the first power source 140, and the other end of the transistor switch SW1 is connected to one end of the second power source 160 and one end of the current source circuit I1. The other end of the current source circuit I1 is connected to one end of the transistor switch SW3. The other end of the transistor switch SW3 is connected to one end of the transistor switch SW4, a node A, and one end of the capacitor C4. The other end of the transistor switch SW4 is connected to one end of the current source circuit I2. The other end of the capacitor C4 is connected to the other end of the current source circuit I2, one end of the transistor switch SW2, a second ground GND2, and the other end of the second power source 160. The other end of the transistor switch SW2 is connected to a first ground GND1 and the other end of the first power source 140.

The second power source 160 may be a capacitor. When there is no fingerprint detection operation, the transistor switch SW1 and the transistor switch SW2 are in the ON state, and the transistor switch SW3 and the transistor switch SW4 are in the OFF state. That is, the second ground GND2 is short-circuited with the first ground GND1, and one end of the first power source 140 is short-circuited with one end of the second power source 160. At this moment, the first power source 140 may charge the second power source 160.

When the fingerprint detection operation is performed, the transistor switch SW1 and the transistor switch SW2 are in the OFF state, and the transistor switch SW3 and the transistor switch SW4 are alternately turned on. That is, the second ground GND2 is disconnected from the first ground GND1, and the first power source 140 is disconnected from the second power source 160. At this moment, the first power supply 140 and the second power source 160 have different ground points (GND1, GND2), and the first power source 140 is independent and different from the second power source 160. At the same time, the current source circuits I1 and I2 and the capacitor C4 constitute the auxiliary enhancement signal source 151 to generate the auxiliary enhancement signal 153 at the node A, wherein the auxiliary enhancement signal 153 can be, for example, a triangular wave.

The second power source 160 can output a high level voltage by using a boosting device (not shown), such that the amplitude of the auxiliary enhancement signal 153 can be greater than the amplitude of the capacitive stimulation signal 133. In order to synchronize the phase of the auxiliary enhancement signal 153 with the phase of the capacitive stimulation signal 133, counters (not shown) may be arranged in the fingerprint detection circuit 130 and the auxiliary enhancement signal circuit 150, respectively, whereby the phase of the auxiliary enhancement signal 153 is synchronized with the phase of the capacitive stimulation signal 133. The aforementioned boosting device and counters can be implemented by those skilled in the prior art based on the descriptions of the present disclosure and thus a detailed description is deemed unnecessary.

The fingerprint detection circuit 130 transmits the capacitive stimulation signal 133 of the capacitive stimulation signal source 131 to a selected fingerprint sensing electrode 111. The capacitive stimulation signal 133 is a sine wave signal, a square wave signal, a triangle wave signal, or a trapezoidal wave signal. The fingerprint detection circuit 130 receives a fingerprint sensing signal 113 from the selected fingerprint electrode 111, applies the fingerprint sensing signal 113 and the capacitive stimulation signal 133 signals individually or together to the amplifier 135 to generate a capacitive elimination shielding signal 137 with a phase as same as the capacitive stimulation signal 133 or the fingerprint sensing signal 113, and then transmits the capacitive elimination shielding signal 137 to the at least one shielding enhancement electrode 120 corresponding to the selected fingerprint sensing electrode 111 for performing a fingerprint detection operation.

At the same time, the auxiliary enhancement signal source 151 of the auxiliary enhancement signal circuit 150 outputs the auxiliary enhancement signal 153 to the at least one shielding enhancement electrode 120 corresponding to the selected fingerprint sensing electrode 111 for performing the fingerprint detection operation. The auxiliary enhancement signal 153 is a sine wave signal, a square wave signal, a triangle wave signal, or a trapezoidal wave signal. It is noted that, during the fingerprint detection operation, there is no current loop existed between the first power source 140 and the second power source 160.

The auxiliary enhancement signal circuit 150 further transmits an inverting auxiliary signal 157 with a phase reverse to the auxiliary enhancement signal 153 to a user's finger through the impedance 159 and a metal ring 170.

In one embodiment, the plurality of fingerprint sensing electrodes 110 and the at least one shielding enhancement electrode 120 are arranged on a glass substrate or a polymer film substrate outside the fingerprint detection integrated circuit chip 400 which includes the fingerprint detection circuit 130. In another embodiment, the plurality of fingerprint sensing electrodes 110, the at least one shielding enhancement electrode 120 and the fingerprint detection circuit 130 are arranged in the fingerprint detection integrated circuit 400.

Figure 6:
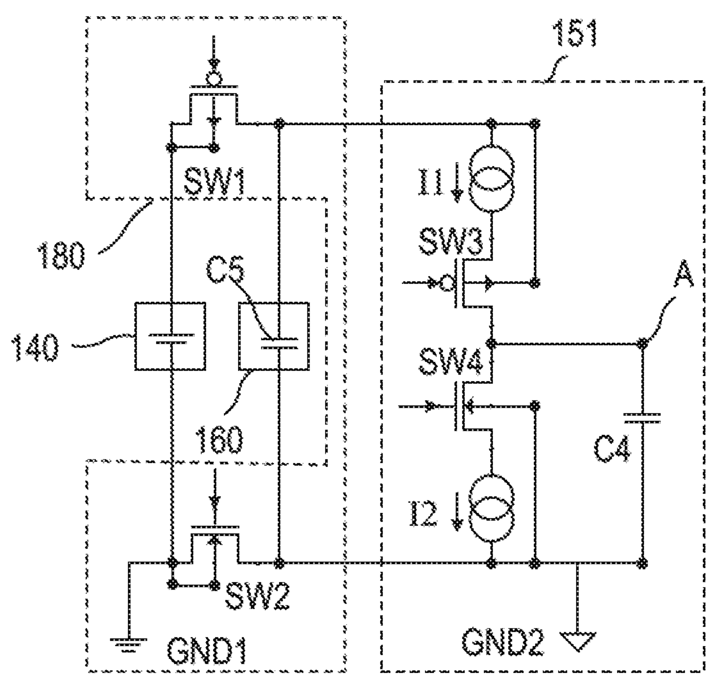
FIG. 6 is a circuit diagram of the power source charging switching circuit, the first power source, the second power source and the auxiliary enhancement signal source of FIG. 5 in accordance with the present disclosure.
Figure 7:
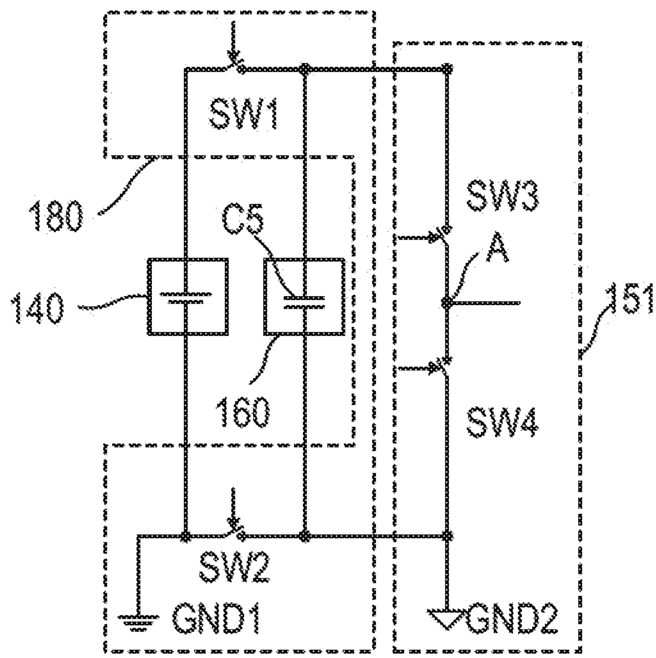
FIG. 7 is another schematic diagram of the power source charging switching circuit, the first power source, the second power source and the auxiliary enhancement signal source in accordance with the present disclosure.
Figure 8:
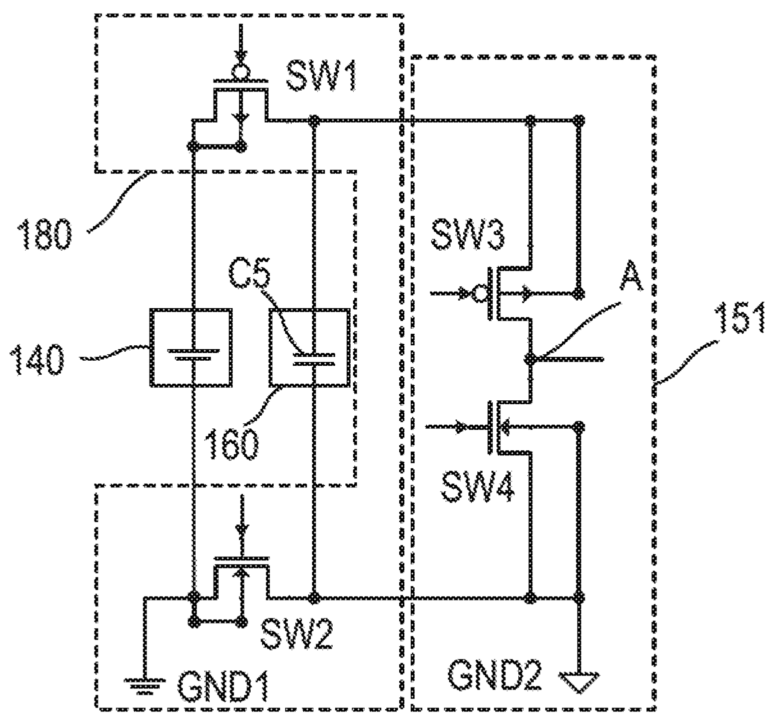
FIG. 8 is a circuit diagram of the power source charging switching circuit, the first power source, the second power source and the auxiliary enhancement signal source of FIG. 7 in accordance with the present disclosure.

FIG. 6 is a circuit diagram of the power source charging switching circuit 180, the first power source 140, the second power source 160 and the auxiliary enhancement signal source 151 of FIG. 5 in accordance with the present disclosure. FIG. 7 is another schematic diagram of the power source charging switching circuit 180, the first power source 140, the second power source 160 and the auxiliary enhancement signal source 151 in accordance with the present disclosure. FIG. 7 is similar to FIG. 5 except that, in FIG. 7, the two current source circuits I1 and I2, and the capacitor C4 are removed. In FIG. 7, the output voltage of the second power source 160 is boosted and outputted as the auxiliary enhancement signal 153, such as a square wave. FIG. 8 is a circuit diagram of the power source charging switching circuit 180, the first power source 140, the second power source 160 and the auxiliary enhancement signal source 151 of FIG. 7 in accordance with the present disclosure.

Figure 9:
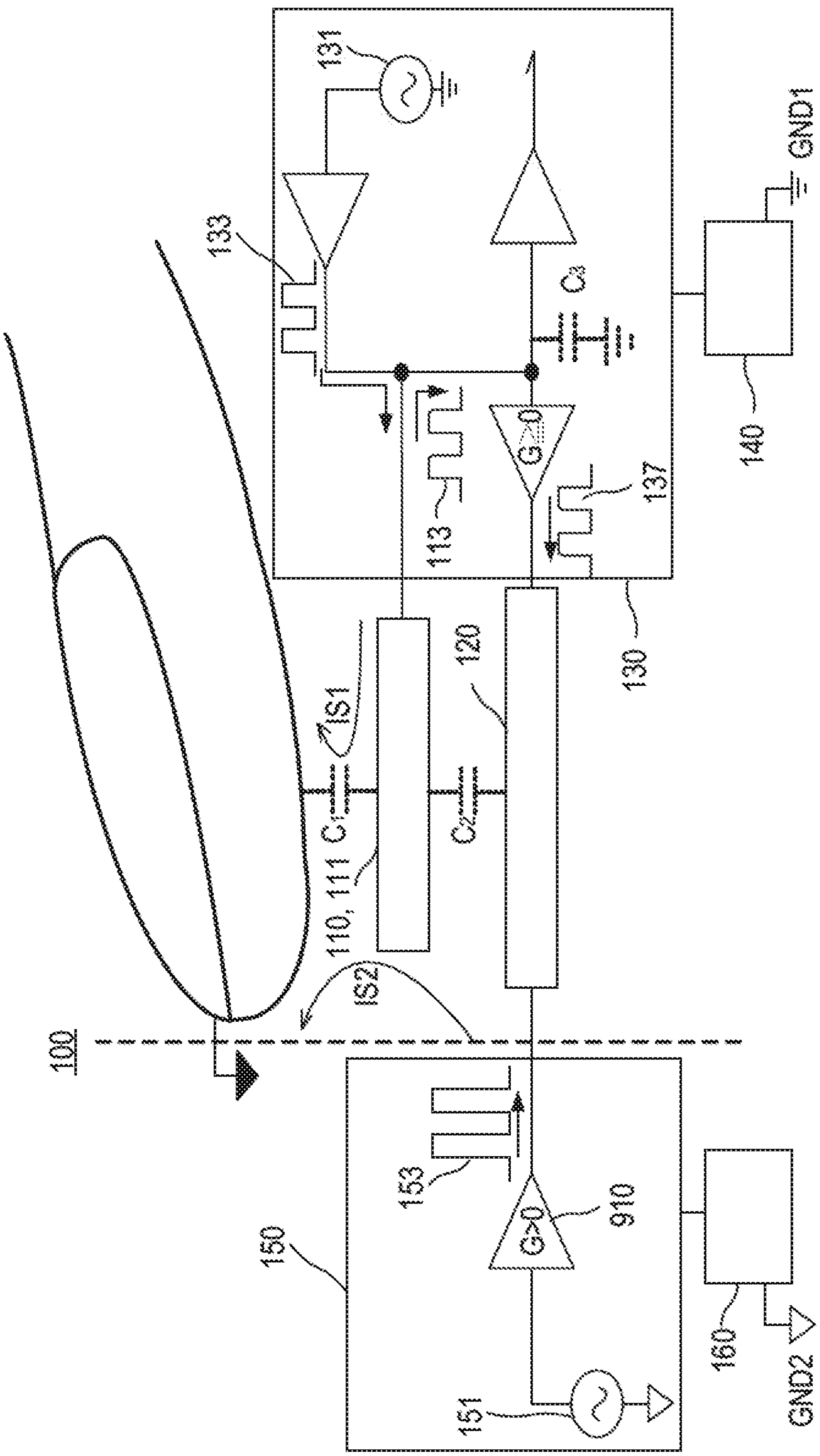
FIG. 9 schematically illustrates an operation of the fingerprint identification device of FIG. 1 in accordance with the present disclosure.

FIG. 9 is a schematic diagram illustrating an operation of the fingerprint identification device 100 of FIG. 1 in accordance with the present disclosure. As shown, the capacitive stimulation signal 133 is coupled to the selected fingerprint sensing electrode 111. The capacitive elimination shielding signal 137 is coupled to the at least one shielding enhancement electrode 120 corresponding to the selected fingerprint sensing electrode 111 through the amplifier 135. At the same time, the auxiliary enhancement signal 153 is coupled to the at least one shielding enhancement electrode 120.

Since the user's finger is equivalent to virtual ground, the charge transfer between the user's finger and the fingerprint detection circuit 130 produces a first current IS1, and the charge transfer between the finger and the auxiliary enhancement signal circuit 150 produces a second current IS2. The sensing voltage Vc1 on the capacitor C1 is [(IS1+IS2)×t]/C1. When the amplitude of the auxiliary enhancement signal 153 is large, the second current IS2 is increased correspondingly and the sensing voltage Vc1 on the capacitor C1 also becomes large, such that the accuracy of the acquired fingerprint image can be effectively increased.

Figure 10:
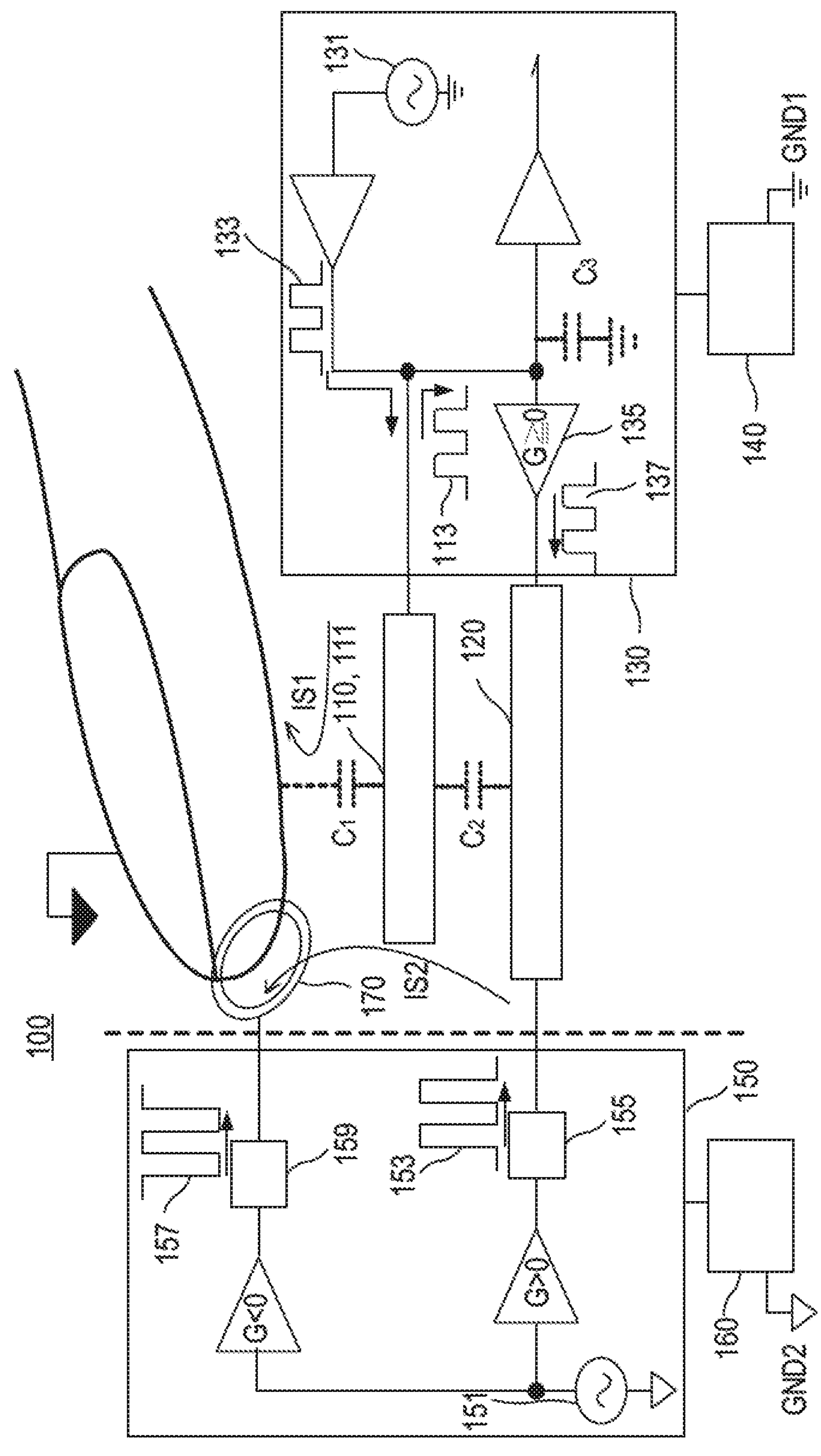
FIG. 10 schematically illustrates an operation of the fingerprint identification device of FIG. 3 in accordance with the present disclosure.

FIG. 10 is a schematic diagram illustrating an operation of the fingerprint identification device 100 of FIG. 3 in accordance with the present disclosure. The operation theory of FIG. 10 is similar to that of FIG. 9, and therefore the sensing voltage Vc1 on the capacitor C1 is determined to be [(IS1+IS2)×t]/C. When the amplitudes of the auxiliary enhancement signal 153 and inverting auxiliary signal 157 are large, the second current IS2 is increased correspondingly, and the sensing voltage Vc1 on the capacitor C1 also becomes large, such that the accuracy of the acquired fingerprint image can be effectively increased.

In view of the foregoing, it is known that, in the present disclosure, the capacitive elimination shielding signal 137 with a phase as same as the capacitive stimulation signal 133 or the fingerprint sensing signal 113 is transmitted to the at least one shielding enhancement electrode 120. Since the capacitive stimulation signal 133 of the selected fingerprint sensing electrode 111 is in phase with the capacitive elimination shielding signal 137 of the at least one shielding enhancement electrode 120, the capacitor C2 can be effectively reduced. Accordingly, more finger sensing signal can be given to the capacitor C1.

In addition, in the present disclosure, the inverting auxiliary signal 157 with a phase reverse to the auxiliary enhancement signal 153 it further transmitted to a user's finger through the impedance 159 and the metal ring 170, which can increase the amplitude of the sensing voltage between the user's finger and the selected fingerprint sensing electrode 111, thereby causing the capacitor C1 to sense more finger sensing signals.

The fingerprint detection circuit 130 and the auxiliary enhancement signal circuit 150 are respectively powered by the first power source 140 and the second power source 160, which are independent and different from each other. When the fingerprint detection circuit 130 and the auxiliary enhancement signal circuit 150 are arranged in different integrated circuits, the fingerprint detection circuit 130 can be fabricated by using a typical voltage integrated circuit process, and the auxiliary enhancement signal circuit 150 can be fabricated by using a high voltage integrated circuit process. Therefore, the auxiliary enhancement signal circuit 150 is capable of generating an auxiliary enhancement signal 153 with a large amplitude. Since the fingerprint detection circuit 130 does not need to be fabricated with the high voltage integrated circuit process, the circuit area can be greatly reduced. At the same time, the auxiliary enhancement signal circuit 150 is only a signal source fabricated by using a high voltage integrated circuit process, and its circuit area is much smaller than the circuit area of the fingerprint detection circuit 130, so that the manufacturing cost can be greatly reduced.

Although the present invention has been explained in relation to its preferred embodiment, it is to be understood that many other possible modifications and variations can be made without departing from the spirit and scope of the invention as hereinafter claimed.

What is claimed is:

1. A fingerprint identification device, comprising:

a plurality of fingerprint sensing electrodes;

at least one shielding enhancement electrode corresponding to a plurality of the fingerprint sensing electrodes;

a fingerprint detection circuit powered by a first power source, and including a capacitive stimulation signal source; and an auxiliary enhancement signal circuit powered by a second power source, and including an auxiliary enhancement signal source, wherein the fingerprint detection circuit transmits a capacitive stimulation signal of the capacitive stimulation signal source to a selected fingerprint sensing electrode, receives a fingerprint sensing signal from the selected fingerprint electrode, applies the fingerprint sensing signal and the capacitive stimulation signal signals individually or together to an amplifier with a gain greater than or equal to zero to generate a capacitive elimination shielding signal with a phase same as the capacitive stimulation signal or the fingerprint sensing signal, and transmits the capacitive elimination shielding signal to the shielding enhancement electrode corresponding to the selected fingerprint sensing electrode for performing a fingerprint detection operation, wherein the auxiliary enhancement signal source of the auxiliary enhancement signal circuit outputs an auxiliary enhancement signal to the shielding enhancement electrode corresponding to the selected fingerprint sensing electrode for performing the fingerprint detection operation.

2. The fingerprint identification device as claimed in claim 1, wherein there is no current loop existed between the first power source and the second power source during the fingerprint detection operation.

3. The fingerprint identification device as claimed in claim 1, wherein the auxiliary enhancement signal has a phase same as the capacitive stimulation signal during the fingerprint detection operation.

4. The fingerprint identification device as claimed in claim 1, wherein, an amplitude of the auxiliary enhancement signal is greater than an amplitude of the capacitive stimulation signal during the fingerprint detection operation.

5. The fingerprint identification device as claimed in claim 1, wherein the fingerprint detection circuit and the auxiliary enhancement signal circuit are arranged in different integrated circuits, respectively.

6. The fingerprint identification device as claimed in claim 1, wherein the plurality of fingerprint sensing electrodes, the at least one shielding enhancement electrode, and the fingerprint detection circuit are arranged in the same integrated circuit.

7. The fingerprint identification device as claimed in claim 1, wherein the plurality of fingerprint sensing electrodes and the at least one shielding enhancement electrode are arranged on a glass substrate or a polymer film substrate beyond an integrated circuit in which the fingerprint detection circuit is arranged.

8. The fingerprint identification device as claimed in claim 1, wherein the capacitive stimulation signal is a sine wave signal, a square wave signal, a triangle wave signal, or a trapezoidal wave signal.

9. The fingerprint identification device as claimed in claim 1, wherein the auxiliary enhancement signal is a sine wave signal, a square wave signal, a triangle wave signal, or a trapezoidal wave signal.

10. The fingerprint identification device as claimed in claim 1, wherein, during the fingerprint detection operation, the auxiliary enhancement signal circuit further transmits an inverting auxiliary signal with a phase reverse to the auxiliary enhancement signal to a user's finger through an impedance.

11. The fingerprint identification device as claimed in claim 1, wherein, the auxiliary enhancement signal circuit transmits an inverting auxiliary signal with a phase reverse to the auxiliary enhancement signal to a user's finger through an impedance.

12. A fingerprint identification device, comprising:

a plurality of fingerprint sensing electrodes;

at least one shielding enhancement electrode corresponding to a plurality of the fingerprint sensing electrodes; and a fingerprint detection integrated circuit, including:

a first power source;

a fingerprint detection circuit powered by the first power source, and having a capacitive stimulation signal source;

a second power source;

an auxiliary enhancement signal circuit powered by the second power source;

a power source charging switching circuit arranged between the first power source and the second power source, and having at least two transistor switches, wherein the fingerprint detection circuit transmits a capacitive stimulation signal of the capacitive stimulation signal source to a selected fingerprint sensing electrode, receives a fingerprint sensing signal from the selected fingerprint electrode, applies the fingerprint sensing signal and the capacitive stimulation signal signals individually or together to an amplifier with a gain greater than or equal to zero to generate a capacitive elimination shielding signal with a phase same as the capacitive stimulation signal or the fingerprint sensing signal, and transmits the capacitive elimination shielding signal to the shielding enhancement electrode corresponding to the selected fingerprint sensing electrode for performing a fingerprint detection operation, wherein the auxiliary enhancement signal circuit outputs an auxiliary enhancement signal to the shielding enhancement electrode corresponding to the selected fingerprint sensing electrode for performing the fingerprint detection operation, and there is no current loop existed between the first power source and the second power source during the fingerprint detection operation.

13. The fingerprint identification device as claimed in claim 12, wherein the power source charging switching circuit further includes two current sources.

14. The fingerprint identification device as claimed in claim 12, wherein, the auxiliary enhancement signal has a phase same as the capacitive stimulation signal during the fingerprint detection operation.

15. The fingerprint identification device as claimed in claim 12, wherein, an amplitude of the auxiliary enhancement signal is greater than an amplitude of the capacitive stimulation signal during the fingerprint detection operation.

16. The fingerprint identification device as claimed in claim 12, wherein the plurality of fingerprint sensing electrodes, the at least one shielding enhancement electrode, and the fingerprint detection circuit are arranged in the fingerprint detection integrated circuit.

17. The fingerprint identification device as claimed in claim 12, wherein the plurality of fingerprint sensing electrodes and the at least one shielding enhancement electrode are arranged on a glass substrate or a polymer film substrate beyond the integrated circuit in which the fingerprint detection circuit is arranged.

18. The fingerprint identification device as claimed in claim 12, wherein the capacitive stimulation signal is a sine wave signal, a square wave signal, a triangle wave signal, or a trapezoidal wave signal.

* * * * *